United States Patent
Lowry et al.

(10) Patent No.: US 10,933,265 B2
(45) Date of Patent: Mar. 2, 2021

(54) AMBIENT MIST SPRINKLER HEAD

(71) Applicants: Jean Lois Lowry, Belleville (CA); Donna Jean Ruby Bondy, Belleville (CA)

(72) Inventors: Jean Lois Lowry, Belleville (CA); Donna Jean Ruby Bondy, Belleville (CA)

( * ) Notice: Subject to any disclaimer, the term of this patent is extended or adjusted under 35 U.S.C. 154(b) by 731 days.

(21) Appl. No.: 14/856,288

(22) Filed: Sep. 16, 2015

(65) Prior Publication Data
US 2017/0021211 A1    Jan. 26, 2017

Related U.S. Application Data

(63) Continuation-in-part of application No. 13/387,416, filed as application No. PCT/CA2010/001182 on Jul. 28, 2010, now Pat. No. 9,199,106.

(60) Provisional application No. 61/229,021, filed on Jul. 28, 2009.

(30) Foreign Application Priority Data

Sep. 17, 2009    (CA) ................................ CA 2679002

(51) Int. Cl.
| | |
|---|---|
| *A62C 31/05* | (2006.01) |
| *A62C 3/00* | (2006.01) |
| *A62C 31/24* | (2006.01) |
| *F16K 31/00* | (2006.01) |
| *F16K 17/38* | (2006.01) |
| *B05B 1/18* | (2006.01) |
| *A62C 99/00* | (2010.01) |

(52) U.S. Cl.
CPC ................ *A62C 31/05* (2013.01); *A62C 3/00* (2013.01); *A62C 31/24* (2013.01); *F16K 17/383* (2013.01); *F16K 31/002* (2013.01); *A62C 99/0072* (2013.01); *B05B 1/18* (2013.01)

(58) Field of Classification Search
CPC ........... A62C 3/00; A62C 31/05; A62C 31/24; A62C 99/0072; B05B 1/18; F16K 17/383; F16K 31/002
USPC .............. 169/37, 70; 239/550, DIG. 13, 271
See application file for complete search history.

(56) References Cited

U.S. PATENT DOCUMENTS

| | | | | |
|---|---|---|---|---|
| 2,993,650 | A * | 7/1961 | Badberg ................... | B05B 1/14 239/271 |
| 5,433,383 | A * | 7/1995 | Sundholm ................ | A62C 3/10 239/550 |

(Continued)

*Primary Examiner* — Steven J Ganey

(57) ABSTRACT

Disclosed herein is an Ambient Mist Sprinkler head for extinguishing fires that comprises a plurality of mist nozzles attached to a head. The Ambient Mist nozzles are arranged spatially on the head at various angles. The number of mist nozzles, the spatial arrangement and the angular placement of the mist nozzles can vary, depending on the area of coverage required. The angular placement of the mist nozzles on the head is effected so that the mist nozzles stream emerging from one mist nozzle does not impinge on a mist stream emerging from another mist nozzle while providing a maximal amount of mist production, and minimizes the occurrence of streams of water droplets.

The present invention relates to Ambient Mist Technology and relates to tools that employ Ambient Technology in combating fire, smoke and airborne pollutants. They do not require gravity to work and can be used at any angle required.

13 Claims, 5 Drawing Sheets

(56) References Cited

U.S. PATENT DOCUMENTS

| | | | | |
|---|---|---|---|---|
| 5,649,599 A | * | 7/1997 | Catanese, Jr. | A62C 31/22 169/70 |
| 6,315,219 B1 | * | 11/2001 | Palestrant | B05B 15/658 239/550 |
| 7,578,454 B2 | * | 8/2009 | Joo | A62C 31/05 169/37 |

* cited by examiner

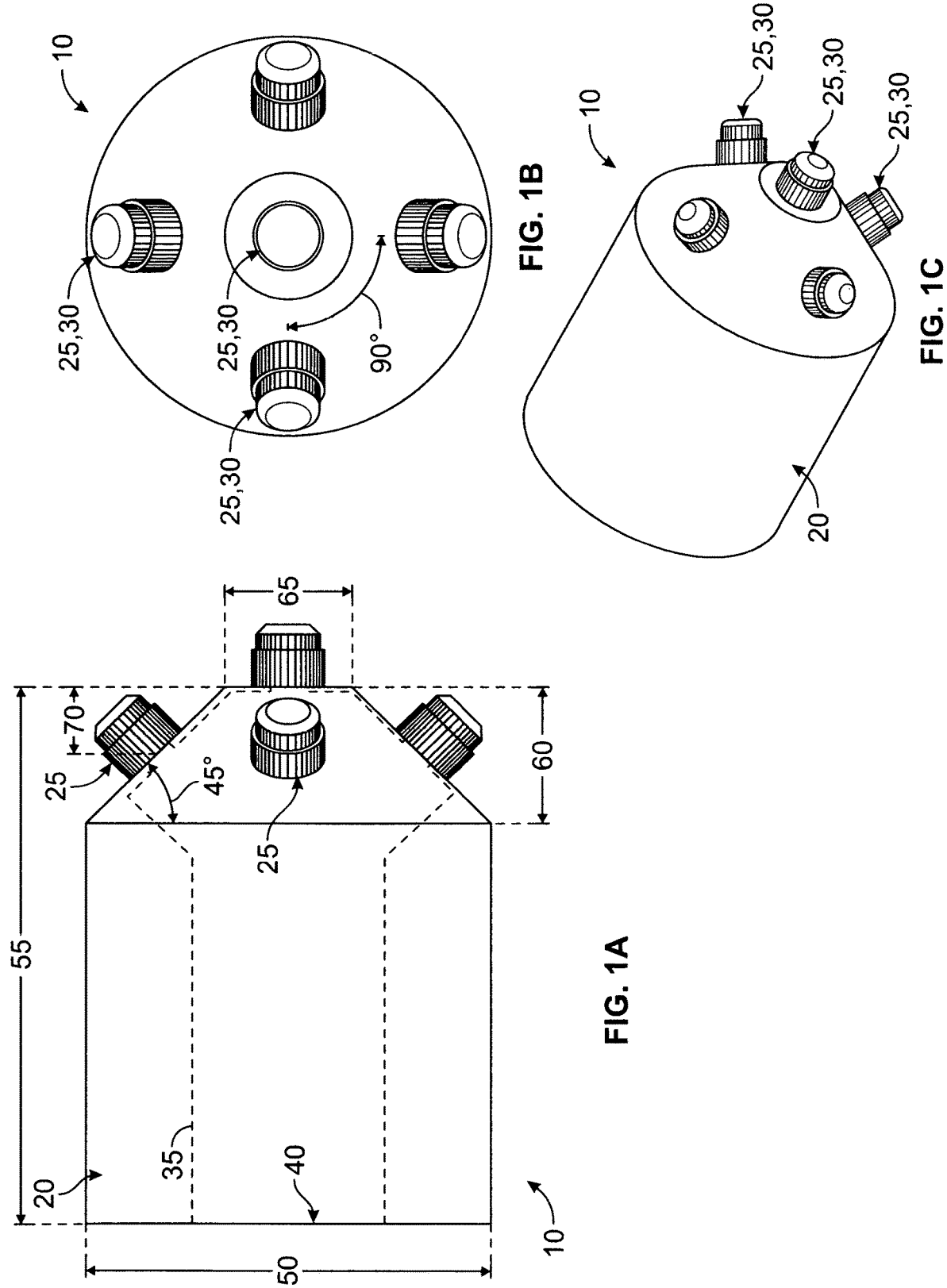

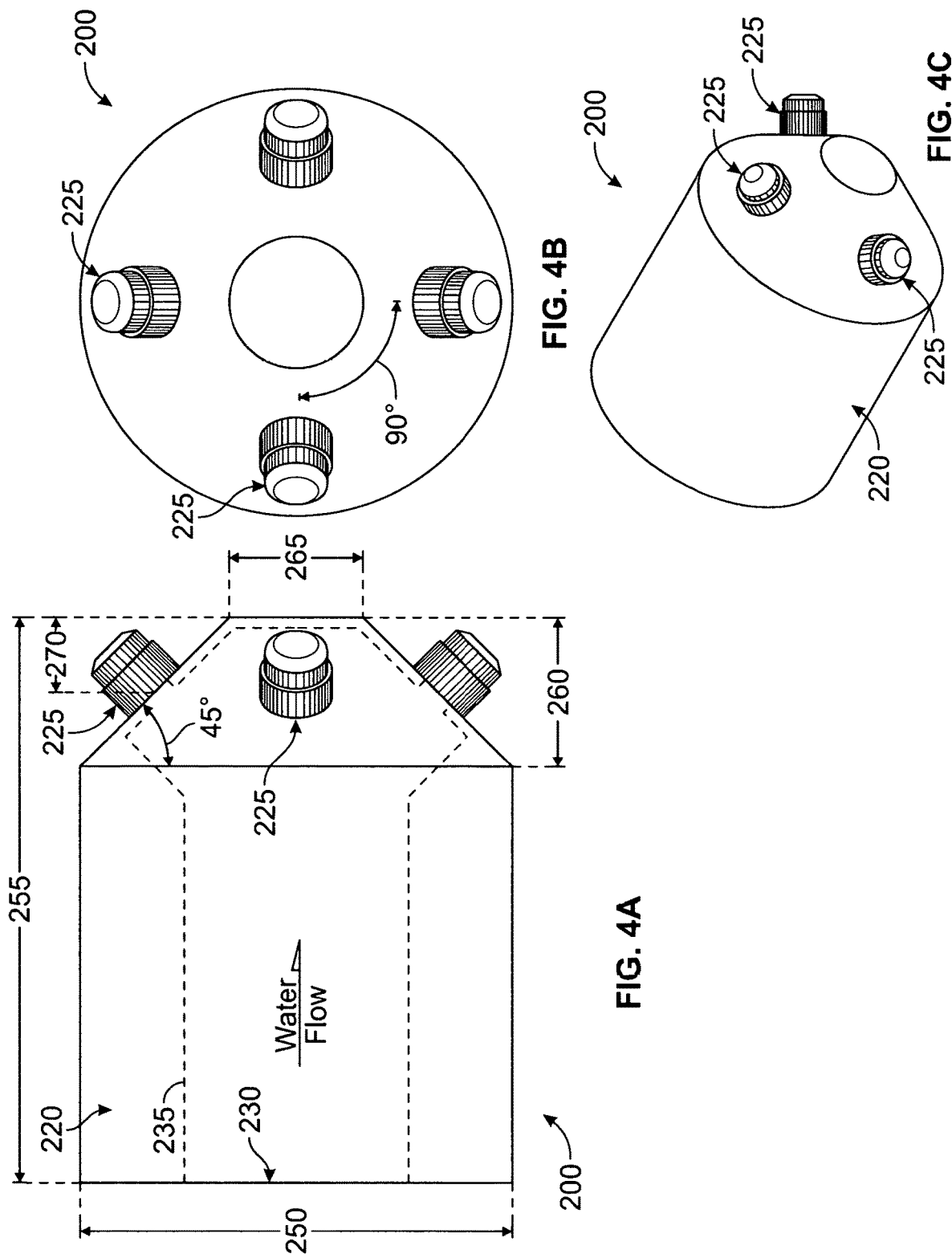

AMBIENT MIST SPRINKLER HEAD

TECHNICAL FIELD OF INVENTION

The present invention relates to ambient mist technology. In particular, the present invention relates to tools that employ ambient mist technology in combating fire, smoke and airborne pollutants.

BACKGROUND OF INVENTION

Fires destroy lives, homes, memories and property each year, costing millions of dollars in damages. Conventional nozzles used in firefighting tools require a high-pressure water source and copious amounts of water. Furthermore, the high pressure of water used in these nozzles often causes extensive structural and water damage to remaining property and possessions. Furthermore, these high-pressure nozzles often create a back draft during the course of use.

As a means of circumventing the damaging effect of high-pressure water nozzles, mist-generating nozzles have been used as an alternative means to fight fires.

Conventional mist nozzles are made of stainless steel, and are often used in grocery stores to spray cold water mist over fresh vegetables. However, these are quite expensive. Other conventional mist nozzles include nozzles used for oil furnaces. However, these rust quickly when used with water. The mist nozzles used in the present invention are relatively inexpensive, made of milled pure brass (so as to prevent the onset of rust), and are quite rugged and durable. The mist head of the present invention can withstand high temperatures caused by fires, without sustaining any damage.

U.S. Pat. No. 4,697,740 discloses a mist generating nozzle that has a cylindrical bearing member in which a plurality of distribution slots are formed. A cylindrical sleeve member is concentrically disposed bout the bearing member, with an annular chamber defined there between. The sleeve member has a plurality of orifices communicating with the annular chamber and which extend transversely with respect to the radius of the sleeve member for imparting rotational motion to the sleeve member in response to the discharge of water through the orifices. The centrifugal force acting on the water discharged through the orifices particulates the water droplets into a fine mist or fog, in a substantially spiral pattern around the nozzle. This particular design requires a high-pressure water input, and releases water at a high pressure rate of up to 100 gallons per minute (gpm). Therefore, a relatively high volume of water is consumed, while damage from the high-pressure output still occurs.

U.S. Pat. No. 4,700,894 discloses a firefighting nozzle forming a generally sphere-like water spray pattern. The nozzle includes a coupler for coupling the nozzle to a water delivery hose. The nozzle also includes a plurality of rings for forming a spray-like pattern.

U.S. Pat. No. 4,736,801 discloses a fire extinguisher that has an elongated manifold for discharging fire in a chimney. The extinguisher is surrounded by a protective cage. The extinguisher comprises a bore, which is connected externally to a standard water supply line. The bore connects internally to a series of lateral channels, each of which connects to a small mist nozzle. The manifold has a pointed end, which penetrates ignited creosote at the base of chimney.

U.S. Pat. No. 5,253,716 discloses a fog-producing firefighting tool that has a nozzle, which includes a plurality of apertures oriented so that when pressurized fluid flows through each aperture, the liquid impacts at an angle of 90 degrees with another stream of liquid to atomize the liquid and create the fog. Moreover, the firefighting tool consists of a plurality of members that are coupled with locking devices.

U.S. Pat. No. 6,173,909 discloses a portable fire extinguishing nozzle arrangement that has a nozzle head provided with fire extinguishing nozzles that may be connected to a supply pipe. A plurality of the nozzles are mutually spaced apart at the front side of the nozzle head. The head contains valve combinations, which allow for the nozzles to be selectively supplied with fluid.

U.S. Pat. No. 6,398,136 discloses a fire fighting tool that incorporates a twist-lock mechanism whereby various nozzles can be interchanged. The fluid aperture angles can be configured to produce a mist in various directions. A key feature is the water streams that exit through the apertures, impinge on other streams emanating from other apertures.

As noted, many of the prior art devices are complex, requiring a plurality of parts, either within the head, or as part of the overall assembly. Additionally, many of these prior art devices require water output from the mist nozzles to intersect, and thus, from water droplets.

As noted, many of the prior art devices are complex, requiring a plurality of parts, either within the head, or as part of the overall assembly. Additionally, many of these prior art devices require water output from the mist nozzles to intersect, and thus, form water droplets.

There is a need for a simple, durable fire extinguishing tool that uses relatively inexpensive, durable, low-pressure mist nozzles, and can operate on low-pressure water input. The low-pressure input results in a relatively low volume of consumption, while the low-pressure output minimizes water and property damage that occurs when conventional high-pressure hoses are used. The firefighting tools should be durable, and should withstand the high temperatures associated with fires. In addition, to minimize the complexity of design, the mist nozzles used in the tool should be configured in a simple manner that does not require the emerging streams to intersect with each other.

SUMMARY OF INVENTION

The invention in its general form will first be described, and then its implementation will be detailed hereafter. These embodiments are intended to demonstrate the principle of the invention, and the manner of its implementation.

Disclosed herein is an ambient mist head that comprises a plurality of mist nozzles attached to a head. The mist nozzles are arranged spatially on the head at various angles. The number of mist nozzles, the spatial arrangement and the angular placement of the mist nozzles can vary, depending on the area of coverage required. The angular placement of the mist nozzles on the head is effected so that the mist stream emerging from one mist nozzle does not impinge on a mist stream emerging from another mist nozzle. The angular placement of the mist nozzles thereby provides a maximal amount of mist production, and minimizes the occurrence of streams of water droplets.

In one aspect of the present invention, there is provided an ambient mist head comprising: a head body with: an inlet for a fluid source; a plurality of outlets; and a cavity within the head body connecting the inlet to the outlets; a plurality of low-pressure mist nozzles equal in number to the outlets; with each mist nozzle attached to the head body at an outlet; wherein a fluid stream exiting from one mist nozzle does not intersect a fluid stream exiting from any another mist nozzle.

In another aspect of the present invention, there is provided an ambient mist head for extinguishing a fire comprising: a) a head body having an inlet for a fluid source; five outlets; and a cavity within the head body connecting the inlet to the five outlets; and b) five low-pressure mist nozzles attached to the head body at each of the outlets; wherein four of the five low-pressure mist nozzles are attached on a bevelled surface of the head body, and the fifth mist nozzle is attached centrally on a planar surface of the head body, the planar surface adjacent to the bevelled surface.

In a further aspect of the present invention, there is provided a firefighting tool comprising: a) a wand having a handle; a water stoppage device located at a first extremity of the wand; and b) an ambient mist head for extinguishing a fire connected to the wand at a second extremity, wherein an external supply line is connected to the wand at the first extremity, and the ambient mist comprising a) a head body having an inlet for a fluid source; five outlets; and a cavity within the head body connecting the inlet to the five outlets; and b) five low-pressure mist nozzles attached to the head body at each of the outlets, with four of the five low-pressure mist nozzles are attached on a bevelled surface of the head body, and the fifth mist nozzle is attached centrally on a planar surface of the head body, the planar surface adjacent to the bevelled surface.

In yet another aspect of the present invention, there is provided an ambient mist head for extinguishing a chimney fire comprising: a) a head body having an inlet for a fluid source; four outlets; and a cavity within the head body connecting the inlet to the four outlets; and b) four low-pressure mist nozzles attached on an external surface of the head body at each of the outlets.

In yet another aspect of the present invention, there is provided a chimney fire extinguishing tool comprising the ambient mist head for extinguishing a chimney fire; a water stoppage device located upstream from the ambient mist head; and a supply line attached to the inlet.

In yet another aspect of the present invention, there is provided an ambient mist head for use in a sprinkler system, the ambient mist head comprising: a) a head body having an inlet for a fluid source at a first extremity; four outlets at a second extremity; and a cavity within the head body connecting the inlet to the four outlets; b) four low-pressure mist nozzles attached to the body at each of the outlets; wherein the four low-pressure mist nozzles are attached on a bevelled surface of the head body.

In yet another aspect of the present invention, there is provided a sprinkler system comprising the ambient mist head for use in a sprinkler system attached to piping; and a water stoppage device located upstream from the mist head.

The mist pattern produced by the device of the present invention can be used to fight four classes of fires, without the occurrence of back draft. Conventional nozzles used in firefighting tools often create a back draft during the course of use. Unlike conventional firefighting materials, the fine mist particles produced by the device of the present invention do not cause damage to the surroundings. For example, conventional nozzles produce dense fog at 174 gallons per minute which blows out the fire and, in most cases, causes extensive damage due to the high pressure of the extinguishing material. In contrast, the mist head of the present invention produces a mist output at a lower rate, preferably 2-40 gallons per minute, more preferably 8-12 gallons per minute, thereby preventing damage to the surroundings.

In addition, the mist produced by the device of the present invention can remove smoke particles, carcinogens and other airborne pollutants.

In contrast to conventional mist nozzles that are made of expensive materials (such as steel), and are prone to rust, the mist nozzles used in the present invention are relatively inexpensive, made of milled pure brass (so as to prevent the onset of rust), and are quite rugged and durable. The mist head of the present invention can withstand high temperatures caused by fires, without sustaining any damage.

The mist nozzles are engineered and milled so as to provide a mist when in use with water. Each mist nozzle has a rate of flow (i.e. number of gallons per minute of vapour produced) preferably in the range of about 2 to 6 gallons per minute, more preferably from 2 to 4 gallons per minute. The mist nozzle is preferably made of milled pure brass, so as to avoid sparks or rust. The mist nozzles tips in the present invention provide an ambient mist with minimal water supply and/or low water pressure. In addition, the mist head is custom milled, and preferably made from anodized aluminum, and more preferably, made from brass. As such, the mist nozzles and head are very durable.

Each mist nozzle is threaded and/or screwed into the head. A threaded hole is preferably drilled into the head for each mist nozzle. The threaded hole may be angled into the head, depending on the required angular placement of the mist nozzle The various components (except the shut off valve) of each tool are also custom milled. The mist nozzles, head and other components are very durable.

Water enters the mist head via a supply line which is attached to the mist head. The supply line is preferably ½ inch (12.7 mm) or ¾ inch (19.05 mm).

Wherever ranges of values are referenced within this specification, sub-ranges therein are intended to be included within the scope of the invention unless otherwise indicated. Where characteristics are attributed to one or another variant of the invention, unless otherwise indicated, such characteristics are intended to apply to all other variants of the invention where such characteristics are appropriate or compatible with such other variants.

The foregoing summarizes the principal features of the invention and some of its optional aspects. The invention may be further understood by the detailed description, which follows.

BRIEF DESCRIPTION OF DRAWINGS

FIGS. 1a, 1b and 1c respectively illustrate a side view, a front view and a perspective view of an embodiment of the present invention.

FIGS. 4a-4c respectively illustrate a side view, a front view and a perspective view of a third embodiment of the present invention.

DETAILED DESCRIPTION

Figure 2A:
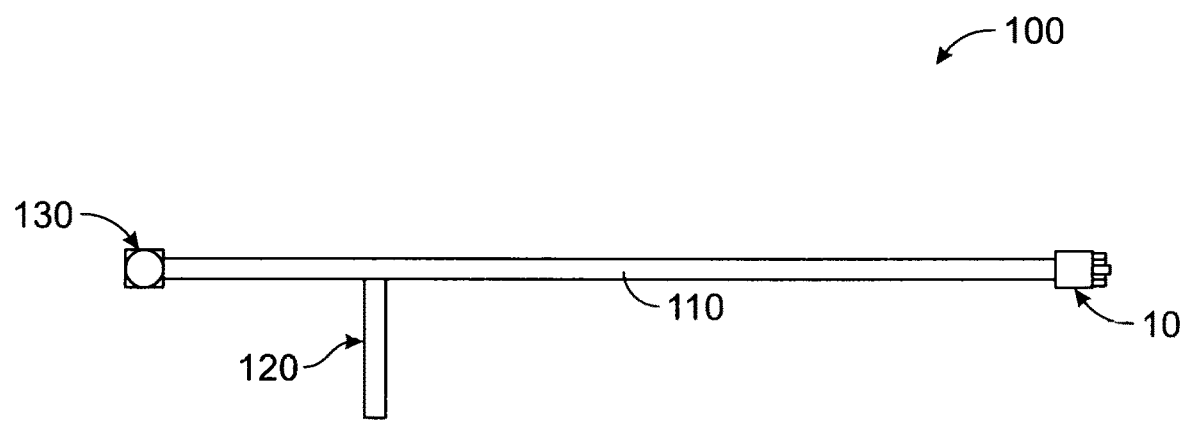
FIGS. 2a and 2b respectively illustrate a side view and a perspective view of a firefighting tool of the present invention using the ambient mist head shown in FIGS. 1a-1c.

The following is given by way of illustration only and is not to be considered limitative of this invention. Many apparent variations are possible without departing from scope thereof.

Firefighting Tool

An ambient mist head (10) used in a firefighting tool is shown in FIGS. 1a-1c. The ambient mist head (10) is shown in perspective form in FIG. 1c; side view in FIG. 1a and end view in FIG. 1b. The ambient mist head (10) has five mist nozzle tips (25, 30): one (25) at each corner of the body (20), and one central nozzle tip (30) at the center of the body (20). A threaded hole is preferably drilled into the body (20) for each mist nozzle (25, 30). The threaded hole may be angled into the head, depending on the required angular placement of the mist nozzle. As seen in FIG. 1a, the corner nozzle tips (25) tips are set at an angle of 45° from the vertical of the head (20), while the central nozzle tip (30) is perpendicular to the horizontal plane of the mist head. As shown in FIG. 1b, each corner tip (25) is set 90° from each other. Each mist nozzle (25, 30) is threaded and/or screwed into the body (25). Each corner nozzle tip has an output of preferably 2 gallons per minute, while the central nozzle tip has an output of preferably 4 gallons per minute.

FIG. 1a illustrates a side view of the head body (20), which comprises inner walls (35) and a threaded opening or inlet (40). The diameter of the threaded opening (40) is preferably ¾ inch (19.05 mm), in order to connect to a standard ¾ inch (19.05 mm) supply line. Alternatively, the diameter of the threaded opening (40) can be ½ inch (12.7 mm) to connect to a standard ½ inch (12.7 mm) supply line. When connected to an external water source, water flows into the inlet defined by the inner walls (35) and exits through each mist nozzle (25, 30). In the present embodiment, the height (50) of the body (20) is about 1.45 inches (36.83 mm); the full length (55) is about 1.9 inches (48.26 mm); the length of the angular portion (60) of the body (20) is about ½ inch (12.7 mm). The other dimensions are as follows: the height of the central portion (65) of the body (20) is about 0.45 inches (11.43 mm), while the distance (70) at which each corner nozzle (25) is placed from the end of the body (20) is about 0.25 inches (6.35 mm). The number of mist nozzles (five), and their placement is found to provide the most effective coverage when used as part of the firefighting tool described below.

Figure 2B:
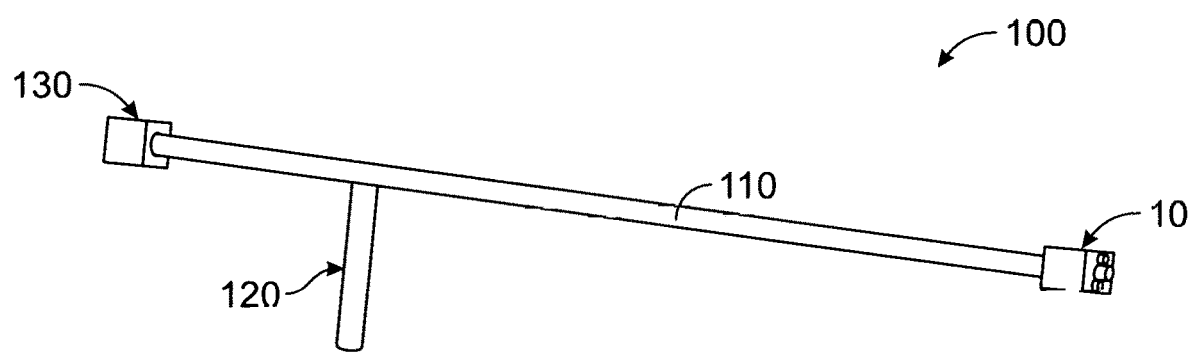

A firefighting tool (100) that uses the ambient mist head (10) of FIGS. 1-3, is shown in FIGS. 2a and 2c. The tool consists of the ambient mist head (10), connected to a wand (110). A handle (120) is attached to the wand (110) for ease of carrying the tool. The wand has a diameter that is equal to that of the ambient mist head (10), which is preferably ¾ inch (19.05 mm). At the other extremity of the wand (110) is an on/off valve (130) which controls the water flow through the wand (110). The valve (130) is preferably of the ball-type variety.

The wand (110) and handle (120) are milled and made of a lightweight material, which is fireproof, and does not become excessively hot. In one test, the firefighting tool was placed in 1200° F. (649° C.) heat, with no damage sustained by the tool. The handle and wand are preferably made of anodized aluminum. The tool can be easily and quickly assembled by attaching the wand (110) to the mist head (10). This equipment can be installed as a fixed system or used as a piece of lightweight, portable firefighting equipment.

The firefighting tool (100) can be attached to a portable pressurized water source (not shown) using a conventional hose or supply line (not shown). At a fire, the valve (130) is turned on so that water fills the tool (100), and enters the ambient mist head (10), building up pressure. As the pressure increases, the nozzle tips (25, 30) atomize the water into a fine mist, which puts out the fire. Once the fire is extinguished, the valve (130) is turned off.

The firefighting tool (10) can operate effectively with low or ambient water pressure. In one experimental test, the firefighting tool was shown to operate effectively using water at a pressure of about 60 psi (about 414 kPa), although the tool will primarily operate at conventional water pressures of 100 psi-120 psi (690 kPa-827 kPa).

The mist produced by the firefighting tool does not blow the fire as conventional nozzles do. While not being limited to any particular theory, it is thought that the mist particles extinguish fire by greatly reducing access to surrounding oxygen; i.e. the low-pressure mist smothers the fire. Furthermore, there is no back draft produced by the firefighting tool.

The fire fighting tool that uses the ambient mist head of the present invention contains, controls and extinguishes fire, in conditions from the earlier incipient fire start to larger, free-burning fires. It can be used to fight fires originating from (but not limited to) materials such as paper or wood, flammable liquids, up to and including live electrical equipment. The firefighting tool is able to extinguish fires from low volumes to large volumes. In particular, it is effective in fighting fires that are Class A, B and C.

Chimney Tool

Figure 3B:
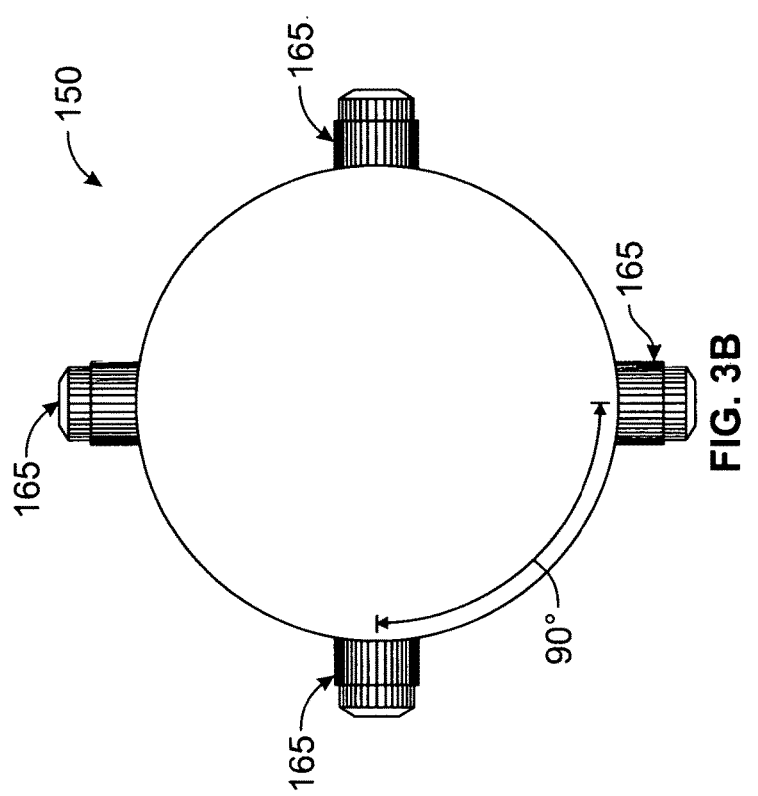
FIGS. 3a-3c respectively illustrate a side view, a front view and a perspective view of a second embodiment of the present invention.
Figure 3C:
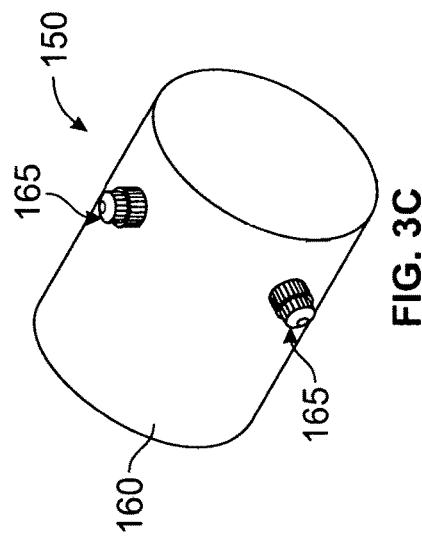
Figure 3A:
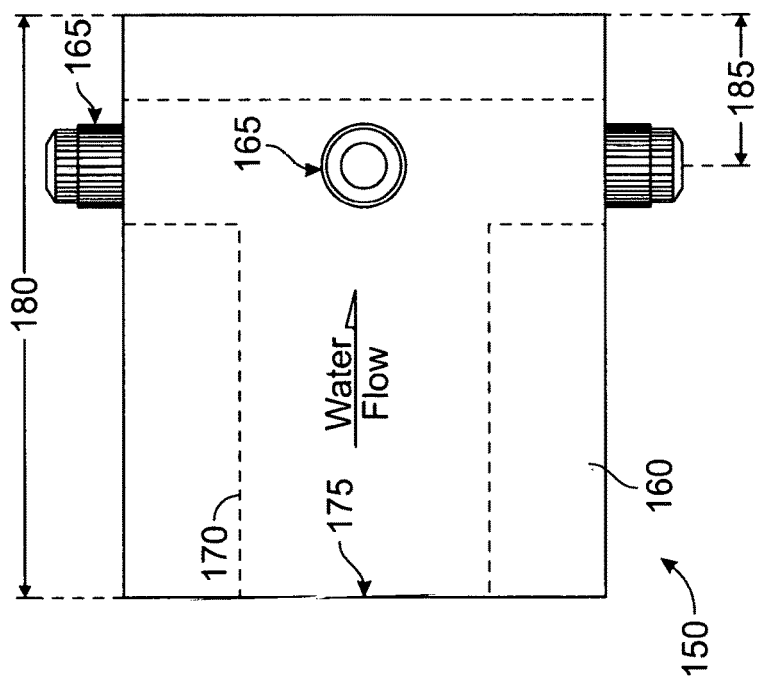

A second embodiment of the present invention is shown in FIGS. 3a-3c. The ambient mist head (150) is shown in perspective form in FIG. 3c; side view in FIG. 3a and end view in FIG. 3b. The ambient mist head (150) comprises an elongated cylindrical head body (160) with an upstream end and downstream end, a flat top at the downstream end, four mist nozzles (165) or four cross holes, spaced equidistantly in a horizontal plane around the external surface of the body (160). As shown in FIG. 3c, the head body (160) is preferably cylindrical, although other shapes are contemplated, such as a rectangular block. The spray tips (165) are 90° from each other. According to FIG. 3a, the body (160) consists of inner walls (170) or a longitudinal hole, which define an orifice through which water flows into through the threaded opening (175), which located at the upstream end; it then exits via the four mist nozzles (165). The diameter of the orifice is preferably ¾ inches (19.05 mm), in order to match standard ¾ inch (19.05 mm) supply lines. Alternatively, the inlet can preferably have a diameter of ½ inches (12.7 mm), in order to match standard ½ inch (12.7 mm) supply lines. The remaining dimensions are as follows: body length (180) is about 1.75 inches (44.45 mm), while distance (185) between the center of each mist nozzle (165) and the end of the body (20) is about 0.45 inches (11.43 mm).

The mist head (150) is attached directly to a hose line (not shown) in order to a form a chimney tool that can be used to extinguish chimney fires. The chimney tool preferably has no handle, and is directly attached to a hose line. The chimney tool further includes a water stoppage device located upstream from the mist head (150); this device is used to stop the inflow of water. When there is a fire, the stoppage device is opened, thereby allowing water to enter the body (160). As the pressure in the body (160) builds up, the nozzle tips (165) atomize the water into a fine mist, which extinguishes the fire. The chimney tool is used by lowering the device down a chimney while water is supplied, thereby creating an ambient mist as the chimney tool is lowered. The ambient mist extinguishes the fire quickly with little or no water damage caused to the flute. Once the fire is extinguished, the system will need to be turned off, drained and reset.

Sprinkler Tool

FIGS. 4a-4c illustrate a third embodiment of the present invention. The ambient mist head (200) is shown in perspective form in FIG. 4c; side view in FIG. 4a and end view in FIG. 4b.

The ambient mist head (200) shown in FIGS. 4a-4c can be used in a sprinkler systems. The head body (220) has four mist nozzle tips (225): one (225) at each corner of the body (220). As seen in FIG. 4a, the corner nozzle tips (225) tips are set at an angle of 45° from a vertical plane of the head (220). As shown in FIG. 4b, each corner tip (225) is set 90° from each other. Each corner nozzle tip has an output of preferably about 2 gallons per minute. The total output of the mist head (200) is preferably about 8 gallons per minute.

FIG. 4a illustrates a side view of the head body (220), which comprises inner walls (235) and a threaded opening (240). The diameter of the threaded opening (240) is preferably ¾ inch (19.05 mm). When connected to an external water source, water flows through the orifice defined by the inner walls (235) and eventually through each mist nozzle (225). In the present embodiment, the height (250) of the body (220) is about 1.45 inches (36.83 mm); the full length (255) is about 1.9 inches (48.26 mm); the length of the angular portion (260) of the body (220) is about ½ inch (12.7 mm). The other dimensions are as follows: the height of the central portion (265) of the body (220) is about 0.45 inches (11.43 mm), while the distance (270) at which each corner nozzle (225) is placed from the end of the body (220) is about 0.25 inches (6.35 mm). The number of mist nozzles (four), and their placement is found to provide the most effective coverage when used as part of the firefighting tool described below.

In FIG. 4b, a front view of sprinkler mist head of FIG. 4a is shown, with the four mist nozzles (225) spaced equidistant along the circumferential surface of the cylindrical head (220).

The sprinkler system further includes a water stoppage device located upstream from the mist head (200); this device is used to stop the inflow of water. When there is a fire, the stoppage device is opened, thereby allowing water to enter the body (220). As the pressure in the body (220) builds up, the nozzle tips (225) atomize the water into a fine mist, which extinguishes the fire. Once the fire is extinguished, the system will need to be turned off, drained and reset.

When the sprinkler tool is activated, a fine mist is produced from the four nozzle tips, which quickly extinguishes the fire. Unlike conventional sprinkler systems, the mist does not cause extensive water damage to the surrounding. A sprinkler of the present invention extinguishes normal combustibles, electrical fires, flammable liquids and gases, with minimal damage. The sprinkler system of the present invention extinguishes Class A, B and C fires.

Furthermore, the sprinkler tool can be placed at any height (e.g. ceiling, floor, or in between the ceiling and floor). It can also be placed in a corner, with nozzle tips of the mist head pointing away from the walls. As such, it can operate on a fire from any angle of a room. The activation of the sprinkler tool can be accomplished by a number of standard activation means. Each of these activation means can be installed onto existing sprinkler systems; i.e. each activation means can retrofit onto existing sprinkler systems.

FIGS. 5a-5d respectively illustrate a side view (closed position); end view (closed position), side view (open position) and end view (open position) of a plunger device used to activate the sprinkler of the present invention. This design is independent of the number or style of heads further downstream from the device.

Figure 5A:
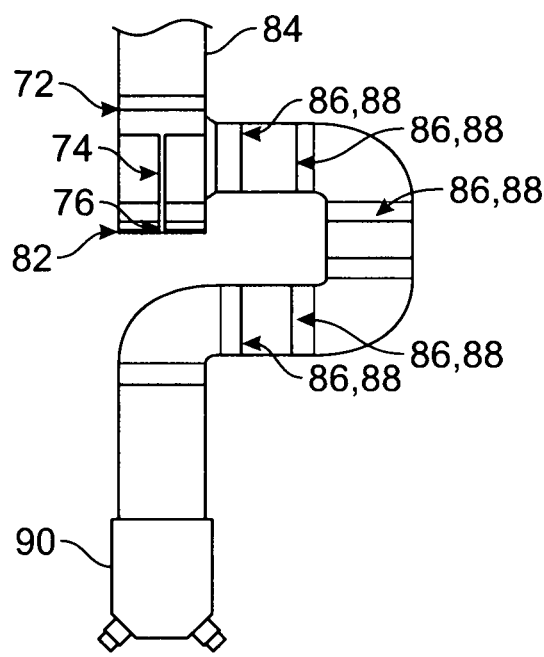
FIGS. 5a-5d respectively illustrate a side view (closed position); end view (closed position), side view (open position) and end view (open position) of a plunger device used to activate a sprinkler using the mist head of FIGS. 4a-4c.
Figure 5B:
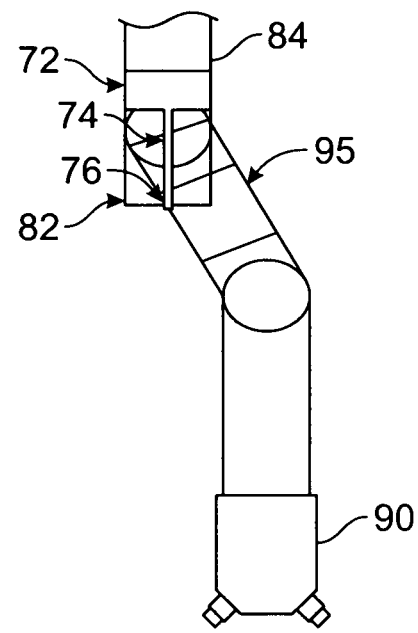

In a front view of the closed position, as shown in FIG. 5a, the plunger device uses a stopper (72), preferably made of rubber, to stay the flow of water and seal the pipe (84). Standard 'T' and pipe fittings (86, 88) are used in the pipe construction. As can be seen from FIG. 5b, the pipe assembly is offset (95) from back to front. The end of the pipe assembly connects to a mist head (90) of the present invention. In FIGS. 5a-5d, the mist head (90) is similar to that shown in FIGS. 4a-4c. A connecting rod (74) is used to give the stopper a great travel distance. A frangible bulb (76) is held in place by a bulb cap (82). In its closed position the stopper/rod (72, 74) device will be held in place by a standard frangible bulb (76). In the closed position the frangible bulb (76) is kept dry and open to the heat.

Figure 5C:
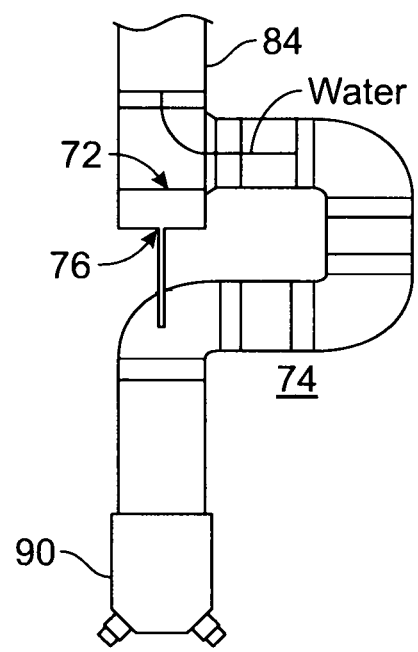
Figure 5D:
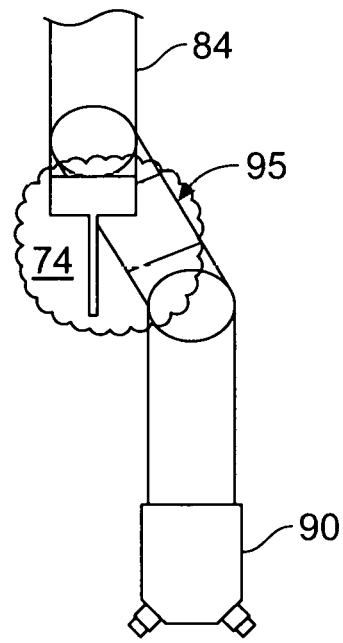

FIG. 5c illustrates what happens when there is a fire. The frangible bulb (76) breaks, allowing the connecting rod (74) to pass through the bulb cap (82). This allows the stopper (72) to drop, which allows the water to flow to the sprinkler mist head (90). The assembly is now in the open position, as shown in FIGS. 5c and 5d. Water pressure will push the stopper (72) downstream and the connecting rod (74) will guide the stopper. As seen in an end view of the assembly in FIG. 5d, the offset pipe assembly (95) allows the connecting rod (74) to drop freely.

This system does not require gravity to work; it can therefore be installed at any angle required. When the stopper (72) comes to its resting place, it will seal off the hole in the bulb cap (82), stopping unwanted leaks. The pipe downstream from the stopper is to be offset to allow the connecting rod (74) to travel its full range of motion. The water can now rush in to the mist head (90), thereby activating a fine mist. After the fire has been suppressed, the device can be reset by pushing the stopper (72) back in place and installing a new frangible bulb (76) in the bulb cap (82).

Another activation means is a butterfly device. A design that incorporates the butterfly device is independent of the number or style of heads further downstream from the device.

The butterfly device uses a circular plate with a grommet, preferably made of rubber, to stay the flow of water. The plate rotates around an offset bar so that when it is released, it will spin to the heavier side. The device is held closed by a lever on the outside of the housing resting on a standard frangible bulb. The frangible bulb is held in place by a sleeve and is resting on a small bar. When there is a fire, the frangible bulb breaks. This will allow the circular plate to move freely. Water pressure will be greater on the larger side of the circular plate and force the plate to spin around the bar. As water starts flowing, the circular plate will stop in a position parallel to the flow of water.

This system does not require gravity to work, so can be installed at any angle required. After the fire has been suppressed, the device can be reset by turning the lever back to its closed position and inserting a new frangible bulb into the sleeve.

Another activation means is a slider device; this design is independent of the number or style of heads further downstream from the device.

The slider device uses a plate, preferably rubberized, to stay the flow of water. The housing of the slider is to be made out of a high heat resistant material. A standard frangible bulb is held in place by a collar at the end of the slider and another collar built into the housing. In its closed position the slider device will be held closed by the frangible bulb. In the closed position the frangible bulb is kept dry and open to the heat.

When there is a fire, the frangible bulb breaks. The spring will provide the initial force to move the slider. As water starts flowing, the angled tail of the slider will assist in moving the slider into its open position. The housing will guide the slider perpendicular to the water flow. In its open position, the tail of the slider will seal the housing, stopping unwanted leaks.

This system does not require gravity to work, so can be installed at any angle required. After the fire has been suppressed, the device can be reset by opening the housing from the end, forcing the slider back into its closed position and installing a new frangible bulb between the collars.

What is claimed is:

1. A water sprinkler system, for use with water having a low water pressure, comprising a hose line; an ambient mist head for direct attachment to said hose line; and a water stoppage device located upstream from said ambient mist head; said ambient mist head comprising: a) a head body, having an upstream end and a downstream end, an inlet for a water source at said upstream end; b) up to four mist nozzles at said downstream end;
wherein the head body consists of an elongated cylindrical body of about 36.8 mm in diameter and about 48.3 mm in length, a flat top located at said downstream end, up to four cross holes in radial direction of the head body located at said downstream end, a longitudinal hole along the length of the head body with an internal threaded portion located at the upstream end, which intersects with the cross holes at the downstream end, in which water flows through and exits via the four mist nozzles; wherein the internal threaded portion has a diameter selected from the group consisting of 12.7 mm and 19.05 mm, for connecting directly to said hose line, said four cross holes being spaced equidistant from each other and in a circumference of the elongated cylindrical body proximate said downstream end; and the cross holes are 11.43 mm off from the flat top;
wherein said low water pressure is selected from the group consisting of about 60 psi (414 kPa) and from about 100-psi-120 psi (690 kPa to 827 kPa).

2. The sprinkler system of claim 1, wherein the hose line attached to the ambient mist head is used as a tool to fight fire in a chimney.

3. The sprinkler system of claim 1, wherein each of the four mist nozzles has a rate of flow output selected from about 2 to 6 gallons per minute.

4. The sprinkler system of claim 3 wherein said rate of flow is from about 2 to 4 gallons per minute.

5. The sprinkler system of any one of claims 1 to 4, wherein each of said low-pressure mist nozzle is made of pure brass and said head body is made of anodized aluminum.

6. The sprinkler system of any one of claims 1 to 3, wherein said water stoppage device is a plunger device, a butterfly device or a slider device.

7. An ambient mist head for use with water having a low pressure, consisting of:
a. a head body, having an upstream end and a downstream end, an inlet for a water source at said upstream end;
b. up to four low pressure mist nozzles at said downstream end; wherein the head body consists of an elongated cylindrical body of about 36.8 mm in diameter and about 48.3 mm in length, a top located at said downstream end, four cross holes in radical direction of the head body located at said downstream end, a longitudinal hole along the length of the head body with an internal threaded portion located at the upstream end, which intersects with the cross holes at the downstream end, in which water flows through and exits via the four mist nozzles;
wherein the internal threaded portion has a diameter selected from the group consisting of about 12.7 mm and about 19.05 mm, for connecting directly to said hose line, said four cross holes being spaced equidistant from each other in a circumference of the elongated cylindrical body proximate said downstream end; and the cross holes are about 11.43 mm off from the top; each of said low-pressure mist nozzles being spaced apart from each other such that a mist stream exiting from one mist nozzle does not intersect a mist stream exiting from any other mist nozzle proximate and distal said mist head; wherein said low pressure is selected from the group consisting of about 60 psi (414 kPa) and from about 100 psi-120 psi (690 kPa to 827 kPa).

8. The ambient mist head of claim 7 having a mist output of from about 6 to 40 gallons per minute.

9. The ambient mist head of claim 7 having a mist output of from about 8 to 12 gallons per minute.

10. The ambient mist head of any one of claims 7 to 9, wherein each low-pressure mist nozzle has a mist output of from about 2 gallons per minute to 4 gallons per minute.

11. The ambient mist head of any one of claims 7 to 9, wherein each of said low-pressure mist nozzle is made of pure brass and said head body is made of anodized aluminum.

12. An ambient mist head for extinguishing a fire using water at a low-pressure consisting of:
a. a head body having an inlet for a fluid source at a first extremity; five outlets at a second extremity; and a cavity within said head body connecting said inlet to said five outlets; wherein each of said five outlets has a mist nozzle tip; wherein four of five outlets are at each corner of the body and one of said five outlets is at the center of the body;
b. five low-pressure mist nozzles, each being attached to said body at each of said outlets; wherein four of the five low-pressure mist nozzles are attached equidistant on a beveled surface angled at 45° along said head body between said first and second extremity, and the fifth low-pressure mist nozzle is attached centrally normal to said second extremity; wherein said low pressure is selected from the group consisting of about 414 kPa and from about 690 kPa to 827 kPa; and
c. a threaded hole drilled into the body for each mist nozzle tip; said threaded hole being angled into the head based on a required angular placement of each mist nozzle tip; each mist nozzle tip being threaded and/or screwed into the body; the height of the body is about 36.83 mm; the full length is about 48.26 mm the length of the angular portion of the body is about 12.7 mm.

13. The ambient mist head of claim 12, wherein each of said four of the five low-pressure mist nozzles have an output of about 2 gallons per minute, and said fifth low-pressure mist nozzle has an output of about 4 gallons per minute.

\* \* \* \* \*